United States Patent [19]

Kruger

[11] 4,042,670
[45] Aug. 16, 1977

[54] PROCESS OF MAKING OXYGEN ENRICHED PLUTONIUM DIOXIDE ($PuO_2$)

[75] Inventor: Owen Lee Kruger, Columbus, Ohio

[73] Assignee: Nuclear Battery Corporation, Columbia, Md.

[21] Appl. No.: 511,089

[22] Filed: Oct. 1, 1974

Related U.S. Application Data

[63] Continuation of Ser. No. 303,085, Nov. 2, 1972, abandoned.

[51] Int. Cl.$^2$ .................... C01G 56/00; C09K 3/00
[52] U.S. Cl. .................... 423/251; 252/301.1 R; 264/.5
[58] Field of Search ............... 423/251; 252/301.1 R; 264/.5

[56] References Cited

U.S. PATENT DOCUMENTS

| 3,420,640 | 1/1969 | Porter | 423/251 |
|---|---|---|---|
| 3,515,875 | 6/1970 | Keshishian | 252/301.1 R |
| 3,520,819 | 7/1970 | Litherland et al. | 264/.5 |
| 3,666,846 | 5/1972 | Sump et al. | 264/.5 |
| 3,677,958 | 7/1972 | Lonadier et al. | 264/.5 |

OTHER PUBLICATIONS

Plymale (1), The Exchange of Isotopically Enriched Oxygen With $^{238}PuO_2$Sol-Gel Microspheres, U.S. At. Energy Comm., 1968, MLM-1462 8 pages.

Plymale (2), J. Inorgan. Nucl. Chem., 1968, vol. 30, No. 3, pp. 886-890.

*Primary Examiner*—Benjamin R. Padgett
*Assistant Examiner*—Josephine Lloyd
*Attorney, Agent, or Firm*—Fleit & Jacobson

[57] ABSTRACT

Process for enriching $^{238}PuO_2$ with $^{16}O$ and forming sintered fuel pellets therefrom comprising the steps of compressing a mass of $^{238}PuO_2$ containing $^{16}O$, $^{17}O$ and $^{18}O$ into a pellet; exposing the pellet to an atmosphere of $^{16}O$ and an inert carrier gas at an increasing temperature up to about 1400° C with varied gas flow to obtain an exchange of $^{17}O$ and $^{18}O$ and the simultaneous sintering of the pellet; and cooling the sintered and exchanged pellet.

9 Claims, 1 Drawing Figure

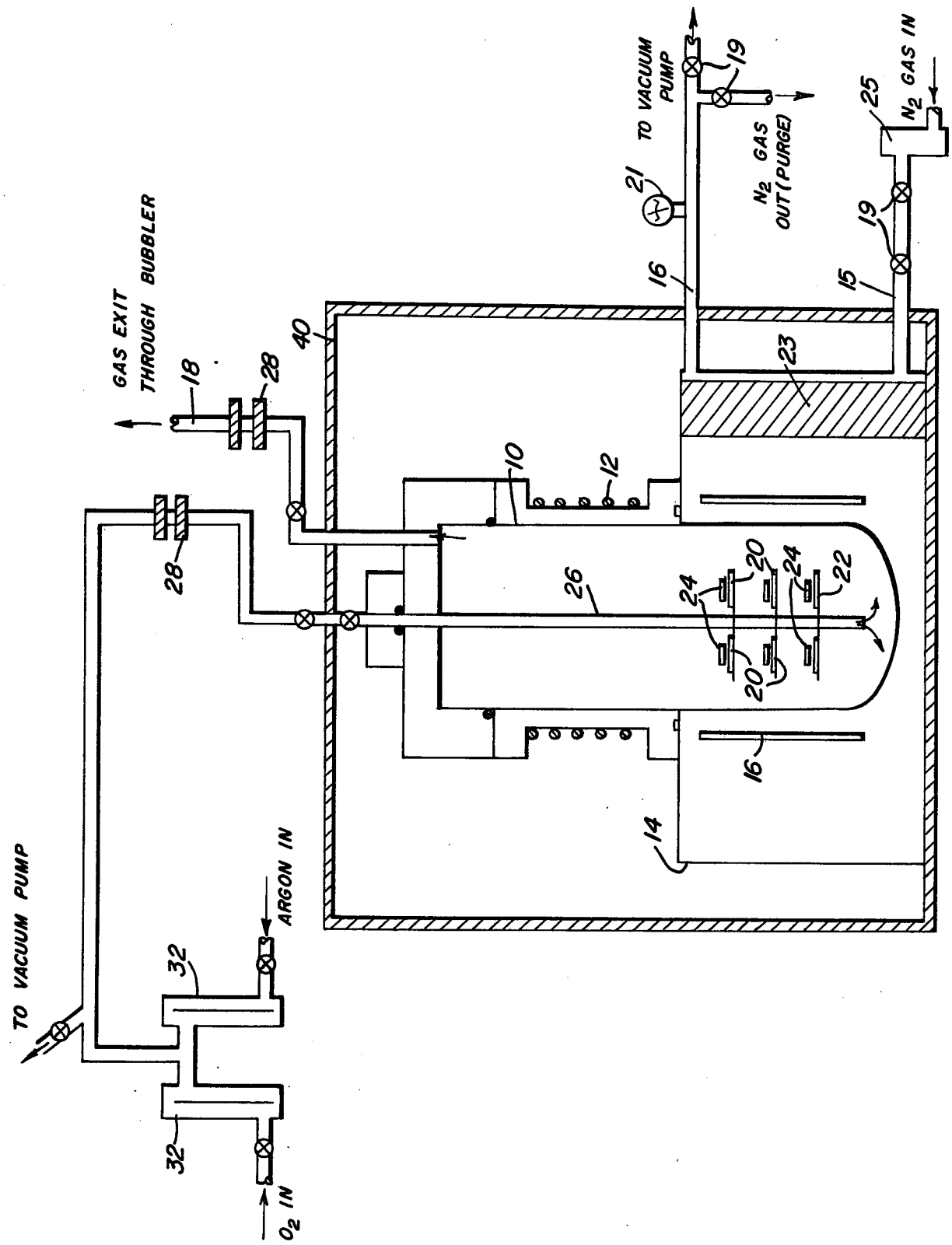

PROCESS OF MAKING OXYGEN ENRICHED PLUTONIUM DIOXIDE (PuO₂)

This is a continuation application of Ser. No. 303,085 filed Nov. 2, 1972, now abandoned.

The present invention relates to a process for making $^{16}O$ enriched $PuO_2$.

BACKGROUND OF THE INVENTION

As known in the prior art, $^{238}PuO_2$ normally contains amounts of $^{17}O$ and $^{18}O$ isotopes in addition to the content of $^{16}O$ and the presence of these other oxygen isotopes produces an unfavorable neutron emission ratio resulting from alpha-neutron reactions thereby rendering such material potentially injurious to health. $^{238}PuO_2$ is generally available today containing 80% or 90% $^{238}Pu$ with the balance containing other isotopes of plutonium but primarily $^{238}Pu$. It has already been suggested by the art, and in particular in U.S. Pat. No. 3,515,875 to V. Keshishian that $^{238}PuO_2$ could be substantially improved through the exchange of the $^{17}O$ and the $^{18}O$ isotopes by the $^{16}O$ isotope. Although several processes have been suggested by the art whereby this exchange by $^{16}O$ may be carried out, such processes, as have been previously advanced, suffer from the admitted disadvantages and drawbacks of low exchange rates, low overall process efficiency and most important high cost to carry out the required exchange.

SUMMARY OF THE INVENTION

It is the purpose of the present invention to provide a process whereby the $^{16}O$ isotope may be exchanged for the $^{17}O$ and $^{18}O$ isotopes presently in $^{238}PuO_2$ for the purpose of lowering the secondary neutron emission resulting from alpha-neutron reactions from such material and rendering such material more suitable for use and less hazardous to health. This is accomplished, according to the process of the present invention, by using a simple one-step process involving densification by sintering of $^{238}PuO_2$ and a simultaneous exchange by the $^{16}O$ isotope for the $^{17}O$ and $^{18}O$ isotopes under preselected process conditions which will yield the most favorable exchange rates and the best overall process efficiency and as a result of which the lowest possible neutron dose rate will be obtained in the resultant fuel pellet. The foregoing is accomplished by using the $^{16}O$ isotope in gaseous form in a relatively pure state and continuously flowing same in the presence of a carrier gas, preferably argon, over pressed fuel disks or cylinders of $^{238}PuO_2$ contained in a suitable furnace arrangement. The process conditions are selected to give the most favorable results and include controlled flow rates of the $^{16}O$ gas and carrier gas throughout the heating and cooling cycles, the arrangement of the $_{238}PuO_2$ pellet within the furnace, the heating and cooling arrangements and other parameters.

Accordingly, the principal object of the present invention is to provide a process for obtaining $^{16}O$ enriched $PuO_2$ by the exchange and removal of the $^{17}O$ and $^{18}O$ isotopes to reduce secondary neutron emission resulting from alpha-neutron reactions and to achieve the lowest possible neutron dose rate in the final fuel pellet.

DETAILED DESCRIPTION OF PREFERRED EMBODIMENT

Referring to the drawing, a preferred embodiment of the present invention will be described in detail. It should be noted, however, that whereas the following specific description of the preferred embodiment is stated in very specific terms, it will be apparent to those skilled in the art that various changes and modifications may be made which do not depart from the essence of the described process, but which embody the principal features of the described process, and accordingly, such modifications are deemed to be within the purview of the invention.

The sole FIG. of the drawing illustrates in schematic terms the novel process of the invention.

As disclosed in the drawing, the apparatus consists of an alumina muffle tube 10 which is water cooled by coil 12. Tube 10 is sealed on one end with the closed end extending into the hot zone of a resistance heated furnace 14 which itself is enclosed. Separate atmosphere controls including valves 19, pressure gauge 21, filter 23 and flowmeter 25, via inlet 15 and outlet 17 are provided for tungsten furnace heaters 16 positioned in furnace 14 to prevent oxidation during a sintering run. Gas flow is directed in a manner whereby impurities are swept away from the pressed pellets and hot zone. An evacuation line 18 is provided on the gas system to expedite purging of the entire system. Platinum foil 20 is placed over aluminum oxide disk platforms 22 which receive fuel pellets 24 to be sintered. Foil 20 prevents silica pickup and possible diffusion interaction with the ceramic material. A hollow alumina pedestal 26 is centrally located within the muffle tube 10 and connected to the gas inlet. Standard high efficiency filters 28 are incorporated into all gas lines as a barrier to plutonium transport. For safety, the entire apparatus is placed in a glove box 40.

The procedure for $^{16}O$ treatment of the fuel is as follows. $^{238}PuO_2$ fuel disks 24 about 80 to 150 mils in diameter and about 50 to 175 mils thick having a weight of from about 150 mg. to about 250 mg. are pressed in a small die under a load of about 10,000 to 20,000 psi. These pellets are then loaded into small platinum boats which are placed on the support platforms 22 or placed on foil 20 placed over platforms 22 of pedestal 26 and the entire assembly including the pedestal 26 is then inserted into the alumina muffle tube 10.

The chamber of furnace 14 is evacuated and back-filled with high-purity nitrogen gas a minimum of three times. On the last evacuation and back-filling cycle, the chamber is back-filled to a positive pressure (between 2 and 3 psig). This slight pressure insures against oxidation of the tungsten mesh heating elements 16 in the event that a leak develops in the muffle tube 10. The inside of the muffle tube 10 is simultaneously purged for five minutes using high-purity argon gas to sweep away all impurities in the system and as a check for proper gas flow operation. Flow rates for the $^{16}O$ and the Ar gas is then set at 250 and about 550 ml/hr on flowmeters 32 (Brooks models R-2-15-AAA and R-2-15-D, respectively).

A heatup rate of approximately two hours is utilized in achieving a red glow ($\sim 700°$ C) within the furnace while maintaining the above gas flow rates. As soon as red heat is distinguished, the flow rate is increased to 1350 ml/hr for the $^{16}O$ and the flow rate is decreased to 350 ml/hr for the argon. These flow rates are maintained for approximately 30 minutes during which time the furnace is raised in temperature from about about 700° C to 950° C. At this point in the procedure, gas flows are again adjusted to 350 ml/hr for the $^{16}O$ and 400 ml/hr for the argon and held at these settings throughout the remainder of the processing period. The furnace temperature is increased to about 1400° C in 1½ hour and subsequently held at this level for two hours prior to cooling. The rate of temperature decrease on cooling to room temperature is achieved by reducing power periodically to approximate a rate of 500° C/hr.

Following several runs of the process as described, measurements were made on the fuel pellets obtained.

Neutron emission measurements were made using a Ludlum fast neutron scintillation detector with a pre-amp discriminator and a Model PC-3A scaler of the type obtained from Nuclear Measurements Corporation.

Five minute counts were made for each of five 0.180 ± 0.003 g pellets before and after firing. The pellets not being counted were stored remote from the counting operation to preclude interference. Background counts were made before and after the pellet counts. The results obtained on the first group of pellets are given in Table I.

TABLE I

SUMMARY OF THE NEUTRON COUNTS TAKEN ON THE FIRST BATCH OF $^{238}$Pu FUEL PELLETS
(Five units weighing 180 mg each)
Total Neutrons per 5-minute Counting Period on Each Pellet

| Before Firing | After Firing | Background |
|---|---|---|
| 1246 | 198 | 32 |
| 1241 | 216 | 36 |
| 1267 | 193 | 36 |
| 1237 | 192 | 35 |
| 1235 | 189 | 30 |
|  |  | 31 |
|  |  | 35 |
|  |  | 33 |
| 6226 ± 79 | 988 ± 31 | 268 ± 16 |

Neutron flux: Before firing: 242.3 ± 3.2 c/m
After firing: 32.8 ± 1 4 c/m
Ratio after/before: 0.136 ± 0.006
Calculated Relative Neutron Flux = 23 × 10³* × 0.136 = 3,117 ± 140 n/sec−g $^{238}$Pu
*From Oak Ridge National Laboratory material specification report The error limits expressed in Table I represent the standard deviation error of the counting. Based on these values, and taking into account the background correction and the flux specified for the $^{238}$PuO$_2$ by Oak Ridge National Laboratory, the relative neutron flux from the pellets is 3,117 ± 140 n/sec-g $^{238}$Pu.

This value compares quite favorably with the 3,055 n/sec-g $^{238}$Pu measured by Leary as reported in Nuclear Applications, 6 287 (1969), L. J. Mullins and J. A. Leary, for electrorefined $^{238}$Pu metal and the repoted theoretical value of 2586 ± 398 n/sec-g $^{238}$Pu as reported in Physical Review, 101, 1016 (1956), D. A. Hicks J. Ise, Jr. and R. V. Pyle.

Values obtained for the total neutron emission from a second batch of 16 fuel pellets are listed in Table II.

TABLE II

SUMMARY OF NEUTRON MEASUREMENTS TAKEN ON SECOND BATCH OF $^{238}$Pu FUEL PELLETS
(16 Pellets Counted Together, Each Weighing about 195 mg)
Total Neutrons per 5-Minute Counting Period

| Before Firing | After Firing | Background |
|---|---|---|
| 2136 | 209 | 10 |
| 2255 | 210 | 22 |
| 2266 | 252 | 15 |
|  | 222 | 16 |
|  | 229 | 12 |
|  |  | 6 |
|  |  | 10 |
|  |  | 11 |
| 6657 + 817 | 1122 ± 33.5 | 102 ± 10.4 |

Relative neutron flux for 16 pellets
Before Firing: 444 ± 11 c/m
After Firing: 44.9 ± 2.8 c/m
Ratio After/Before = 0.101
Neutron Flux: 23 × 10³ × 0.101 = 2323 ± 232 n/sec−g $^{238}$Pu These data confirm the low neutron flux output of the first batch of fuel pellets and within the error of measurement appear relatively close to the theoretical output.

The identical exchange process was also applied to an 80 percent $^{238}$Pu as part of an effort to fabricate a 1.8 watt heat source. The neutron counts obtained on this material given in Table III, are in excellent agreement with the data found for the group of 16 pellets.

TABLE III

SUMMARY OF NEUTRON COUNTS TAKEN ON 1.8-WATT PELLET OF 80% $^{238}$Pu
(4.52 g Pellet, About 0.5 cc in Volume)
Total Neutrons per 5-Minute Counting Period

| Before Firing | After Firing | Background |
|---|---|---|
| 3233 | 280 | 11 |
| 3089 | 298 | 12 |
| 3023 | 278 | 10 |
|  | 323 | 15 |
|  |  | 5 |
|  |  | 5 |
|  |  | 9 |
|  |  | 8 |
| 9345 ± 96.6 | 1179 ± 34.3 | 75 ± 8.7 |

Relative Neutron Flux
Before Firing: 623 ± 16 c/m
After Firing: 58.8 ± 3.1 c/m
Ratio After/Before: 0.0916 ± 0.005
Neutron Flux: 24.4 × 10³ * × 0.0916 = 2,240 ± 224 n/sec−g $^{238}$Pu
*From Oak Ridge National Laboratory material specification report.

The work results obtained by this novel process demonstrate that the neutron flux from the dioxide of high purity 90 percent $^{238}$Pu can be reduced to values near those found for the dioxide of electrorefined medical grade $^{238}$Pu when oxygen-16 exchange is employed in conjunction with high temperature sintering Measurements made on the fairly large fuel pellet containing 4.52 g of oxide, suggest that pellet size is not a particularly critical factor in the exchange process. These data appear to emphasize the importance of the oxygen-16 flow rate and perhaps the gas flow pattern in conjunction with the sintering cycle.

What is claimed is:

1. Process for enriching $^{238}$PuO$_2$ with $^{16}$O and forming sintered fuel pellets therefrom comprising
   1. Compressing a mass of $^{238}$PuO$_2$ into a pellet, the oxygen atoms of the $^{238}$PuO$_2$ mass having a natural distribution of the $^{16}$O, $^{17}$O and $^{18}$O isotopes;
   2. exposing said pellet to an atmosphere of oxygen enriched in the $^{16}$O isotope and an inert carrier gas and gradually heating said pellet to a temperature of about 1400° C to obtain an exchange of $^{17}$O and $^{18}$O by $^{16}$O and the simultaneous sintering of said pellet; and
   3. cooling said sintered and exchanged pellet.

2. Process according to claim 1 wherein the inert carrier gas is argon.

3. Process according to claim 1 wherein said exposing and heating is accomplished in a chamber and further wherein the concentrations of $^{16}O$ and the carrier gas in said atmosphere are varied during heating of the pellet by changing the flow rates of the $^{16}O$ and carrier gas fed to said chamber.

4. Process according to claim 3 wherein the flow rate of $^{16}O$ is greater than that of the carrier gas between about 700° C and about 950° C and less that of the carrier gas above about 950° C.

5. Process according to claim 1 wherein the atmosphere is enclosed in a gas tight zone which is surrounded by a nonoxidizing atmosphere.

6. Process according to claim 1 wherein cooling takes place at the rate of about 500° C per hour.

7. A process for enriching $^{238}PuO$ with $^{16}O$ and forming sintered fuel pellets therefrom, comprising:
  1. compressing into a pellet a mass of $^{238}PuO_2$ the oxygen atoms of the $^{238}PuO_2$ mass having a natural distribution of the $^{16}O$, $^{17}O$ and $^{18}O$ isotopes;
  2. placing said pellet in a confined chamber having an inlet port and an outlet port;
  3. exposing said pellet to an atmosphere consisting essentially of oxygen enriched in the $^{16}O$ isotope and an inert carrier gas by flowing said oxygen at a rate of about 250 milliliters per hour and said carrier gas at a rate of about 550 milliliters per hour through said chamber from said inlet port to said outlet port;
  4. heating said pellet for a period of about two hours up to a temperature at which it undergoes red glow while maintaining the oxygen and carrier gas flow rates of step 3 in said chamber;
  5. after red glow, adjusting the flow rate of said oxygen to about 1350 milliliters per hour and the flow rate of said carrier gas to about 350 milliliters per hour;
  6. raising the temperature of said pellet to about 950° C over a period of about 30 minutes while maintaining the $^{16}O$ and carrier gas flow rates of step (5);
  7. decreasing the oxygen flow rate to about 350 milliliters per hour and increasing the carrier gas flow rate to about 400 milliliters per hour;
  8. increasing the temperature of said pellet to about 1400° C in a period of about 1-½ hours while maintaining the $^{16}O$ and carrier gas flow rates of step (7) and maintaining the temperature of said pellet at about 1400° C for a period of about 2 hours while maintaining the flow rate of said oxygen at about 350 milliliters per hour and the flow rate of said carrier gas at about 400 milliliters per hour to obtain an exchange of $^{17}O$ and $^{18}O$ by $^{16}O$ and the simultaneous sintering of said pellet; and 8. The process of claim 7 wherein said carrier gas is argon.

9. cooling said pellet to room temperature at a rate of about 500° C per hour while maintaining the gas flow rates of said oxygen at about 350 milliliters per hour and said carrier gas at about 400 milliliters per hour.

* * * * *